May 21, 1963 H. W. SHUMAKER 3,090,645
HORIZONTAL DEFLECTOR
Filed Oct. 7, 1960 2 Sheets-Sheet 1

INVENTOR.
Hugh W. SHUMAKER
BY
Robinson & Berry
ATTORNEY'S

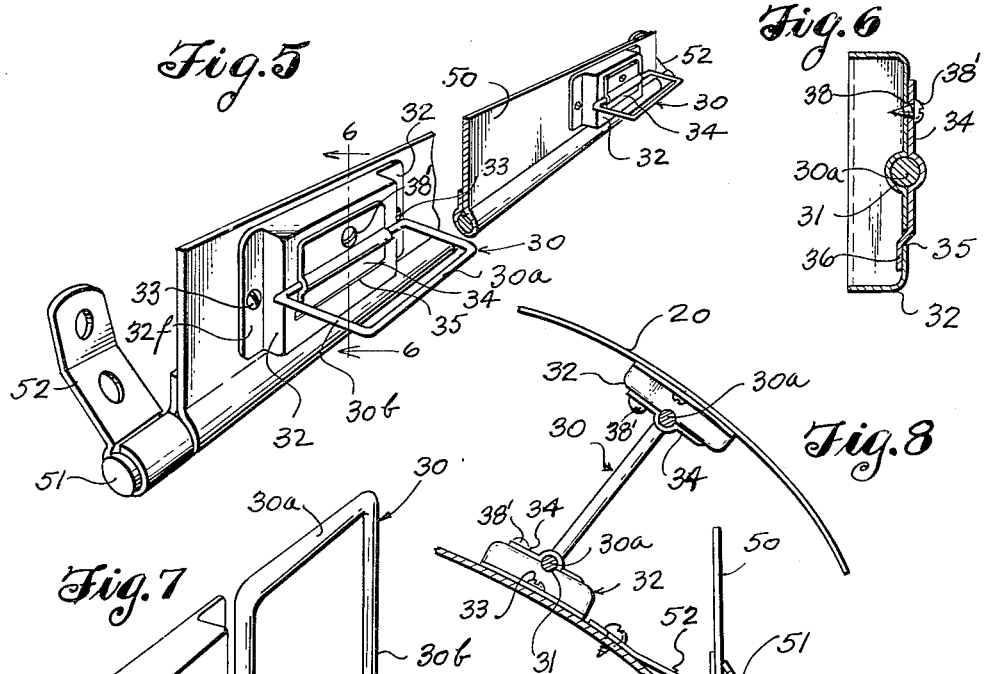
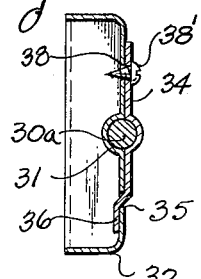
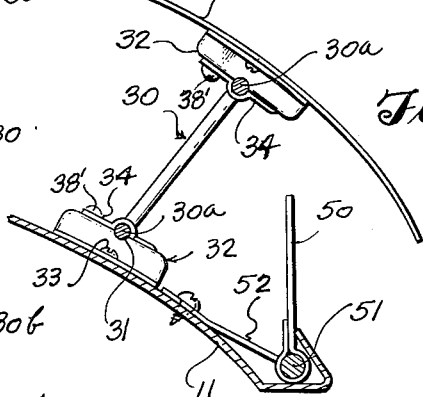
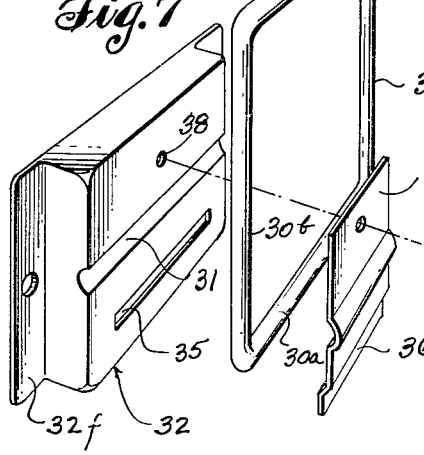
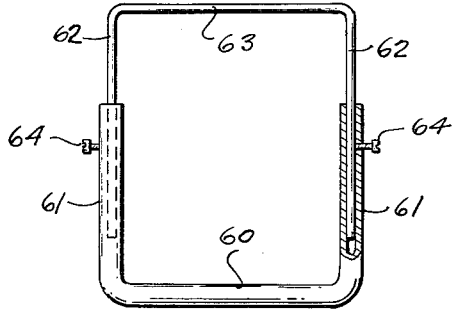
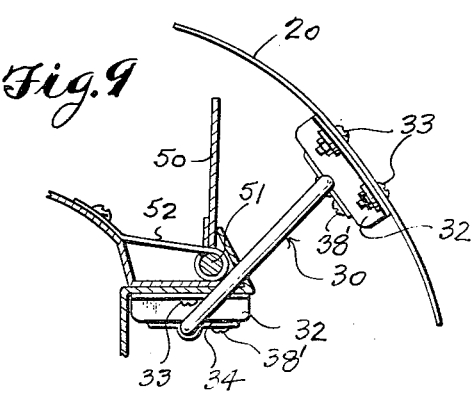

United States Patent Office 3,090,645
Patented May 21, 1963

3,090,645
HORIZONTAL DEFLECTOR
Hugh W. Shumaker, 517 S. Jackson, Moscow, Idaho
Filed Oct. 7, 1960, Ser. No. 61,191
1 Claim. (Cl. 296—91)

This invention relates to improvements in wind deflectors as designed for and as applied to motor vehicles, particularly as applied to automobiles of station wagon types for the deflecting of slip stream air currents downwardly across their back end windows to keep them clear of vision obscuring dust; it being well known that the use of deflectors for this purpose is now a well known practice.

This invention further relates to certain improvements in the rain gutter formation or design as employed across the rear end or edge boundary of the vehicle top to better adapt it for its use especially when wind deflectors are associated therewith.

It is the principal object of the present invention to provide a wind deflector that is adapted to be applied to and across the rear end of the vehicle top, above the rear window whereby slip stream air flowing rearwardly across the vehicle top will be deflected downwardly against and across the rear end window pane, and to so modify or improve the rain gutter structure and design that water caught therein will not be allowed to overflow and caused to be driven by the deflected slip stream air downwardly against the rear window where it would operate to obscure the driver's view through the rear window.

It is further object of this invention to provide a rain gutter design that adapts the rear gutter wall to serve additionally as a mounting for the present wind deflector.

Yet another object of the present invention is to provide means for use more particularly with the ordinary types of shallow rain gutters as formed across the rear end edge of the top of a present day automobile to prevent any overflow of water therefrom that would become detrimental to the driver's rear view therethrough, and to provide wind deflectors with adjustable mountings to adapt them for adjustment in their positions of use with such overflow prevention means.

Further objects and advantages of this invention reside in the details of construction and combination of parts, as will hereinafter be fully described.

In accomplishing the above mentioned and other objects and advantages of this invention, I have provided the improved details of construction, the preferred forms of which are illustrated in the accompanying drawings, wherein:

FIG. 5 is a perspective view of a strip designed for application to the usual type of rain gutter to prevent overflow of water across its back edge.

FIG. 6 is an enlarged sectional detail taken through the link mounting base on line 6—6 in FIG. 5.

FIG. 7 is an exploded view in perspective, the parts of one of the deflector mounting hinge link bases shown in FIG. 5.

FIG. 8 is a vertical, cross-section through a rain gutter and portion of the vehicle top showing the manner of mounting the wind deflector forwardly of the rain gutter.

FIG. 9 is a similar view showing another mounting location for the wind deflector.

FIG. 10 is a view showing an extendable and retractable deflector mounting hinge link.

Figure 1:
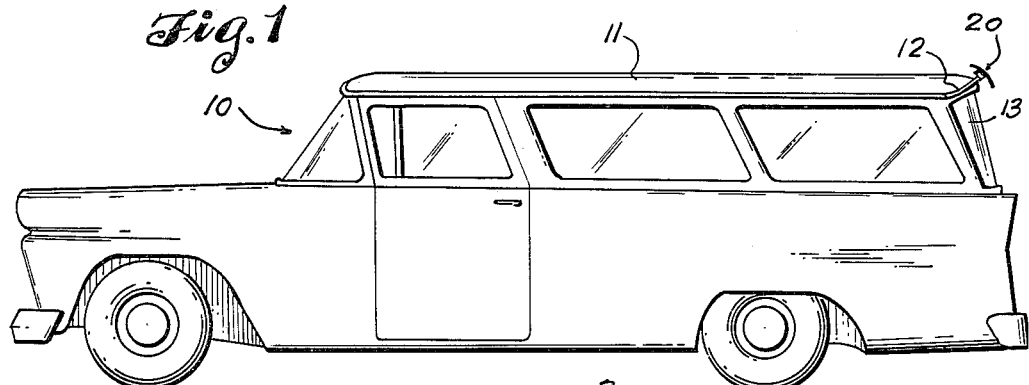
FIG. 1 is a side view of a present day automobile of station wagon type, that is equipped with a wind deflector embodied by the present invention.

Referring more in detail to the drawings:

In FIG. 1, 10 designates a common station wagon type or model of automotive vehicle having the usual sheet metal roof or top 11 that terminates at the rear end of the vehicle body, above and across the rear end window in a rain gutter designated generally by reference numeral 12. This gutter as shown in cross-section in FIG. 3, embodies the improvements of the present invention whereby overflow of water therefrom onto the rear window pane 13 is prevented.

Figure 3:
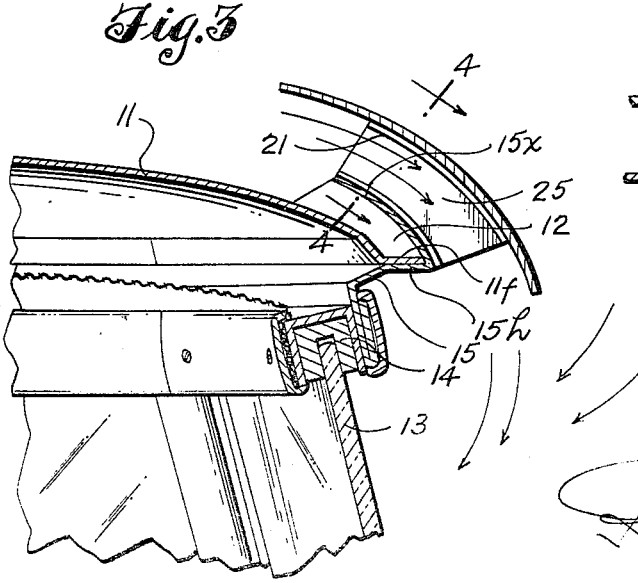
FIG. 3 is an enlarged, cross-sectional detail, taken on line 3—3 in FIG. 2.

FIG. 3 also indicates that the pane 13 is mounted for vertical sliding adjustment and is adapted to be closed and sealed at its top edge within a joint sealing strip 14 of rubber or the like that is secured in the body or window frame structure. The rain gutter 12, as provided across the rear end edge of the top 11 is formed in part by the downwardly sloping rear end portion of the metal top 11 which terminates in a rearwardly directed horizontal flange 11f to which a formed finishing strip 15 is fixedly applied to extend across the top of the window opening. This particular strip 15 includes a longitudinal portion 15h that flatly underlies and is securely joined with the rear end flange 11f of the top structure, and from which a flange 15x of substantially greater width is upwardly and forwardly turned as well shown in FIG. 3, to provide the rear wall of the rain gutter. It is to be understood that this rear end gutter 12 slopes downwardly in opposite directions from the center line of the vehicle and may join in the usual way with the opposite side edge gutters, as shown in FIG. 1, or may discharge downwardly to the sides of the vehicle body.

That particular construction shown in FIG. 3, which shows the gutter 12 to be characterized by its unusual depth, is designed to eliminate the possibility of overflow of water therefrom that is usually experienced when a vehicle, with rain gutters of the common relatively shallow formation, is traveling forwardly in a heavy rain. Such overflow will be spilled onto the rear window and result in obscuring the driver's rear view through the window 13. This view would be even more obscured if the overflow was caused to be directed to greater extent against the window by reason of the use of a wind deflector mounted as shown in FIG. 3.

Figure 2:
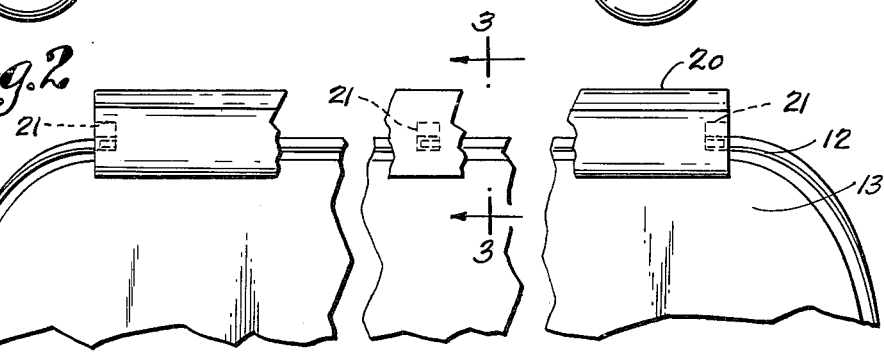
FIG. 2 is a rear end elevation of a top portion of the vehicle of FIG. 1, showing the wind deflector of the present invention, as applied thereto.
Figure 4:
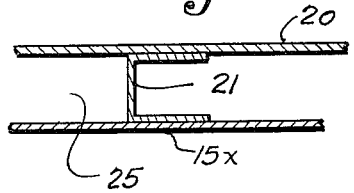
FIG. 4 is a cross-section, taken on line 4—4 in FIG. 3.

The present wind deflector 20 is shown in FIGS. 1, 2 and 3 as being extended horizontally across the vehicle top, substantially to its full width and to be attached functionally to the vehicle at its opposite ends and at a medial point by brackets 21, as seen in FIG. 4. The deflector is here indicated as being a continuous plate of sheet metal or the like that is transversely curved so that, as applied in FIG. 3, it assumes a position substantially parallel with the downwardly curving rear end portion of the body top 11, but outwardly spaced from the flange 15x of the gutter to provide an air passage or channel 25 between them for rearward flow therethrough of slip stream air, and to cause this outflowing slip stream current of air to be downwardly deflected against and across the window pane 13, as indicated by the arrows shown in FIG. 3.

It can readily be understood, by reference to the detailed construction herein shown, particularly in FIGS. 2, 3 and 4, that the rear wall 15x of the rain gutter 12 will ordinarily prevent rain from overflowing and being blown by the slip stream air against the window. And it will further be understood that the slip stream air, as downwardly directed by the deflector will resist and destroy the suction created immediately back of the rear window and will maintain its function of keeping the window clear when driving in or during adverse weather conditions.

The curvature required or desired of plate 20 and the position of the plate relative to the rear end is generally established by experimentation, and it may be varied to suit different vehicle construction and various conditions of use.

In FIGS. 8 and 9, I have illustrated a wind deflector equipped with an alternative form of mounting means that may be used in lieu of the rigid brackets shown in FIGS. 3 and 4 and which permits the deflector plate 20 to be located in different angular positions and at different spacings relative to the rain gutter. It is shown in FIG. 8 that the deflector 20 is mounted on the car top 10 forwardly of the gutter while in FIG. 9 it is shown as being mounted rearwardly of the gutter. The deflector mounting means in each instance are applied thereto near its opposite ends and each comprises a pair of rectangular links 30 of like size, each made of a continuous piece of stiff wire bent to the desired rectangular form. Each link, as best observed in FIG. 7, has upper and lower cross-members 30a—30a and opposite side members 30b—30b. The cross-members 30a of the links are seated in channels 31 formed in rectangular, die stamped metal bases 32 which are flanged at their ends as at 32f for their fixed securement. One of the bases 32 is shown in FIG. 8, to be fixed to the car top 11 and the other fixed to the underside of the gutter. In each instance, securement is by means of screws 33 applied through the flanges 32f. After the links have been thus seated, they are held in position by overlying plates 34 that are fixed to the bases 32 in the manner well shown in FIG. 8.

It is apparent, by reference to FIG. 8 that the links may be swingingly adjusted and secured to the bases for angular adjustment of the deflector and to effect change in its relationship to the car top.

As a feature of construction, particularly for the adjustable securement of the deflector mounting links, the bases 32 are each formed, as in FIG. 7, with a slot 35, parallel to and spaced from the seat 31 at one side thereof, and at the other side of the seat the base is formed with a screw hole 38 and the plates 34 are formed, as shown in FIGS. 6 and 7, with an offset lower edge flange 36 designed for projection into the slot 35 as shown in FIG. 6 to secure and at the same time permit the plate to be laid across the lower end seated cross-member 30a of the link and the opposite end of the plate to be drawn down and secured by a screw 38' to the base thus to clamp the cross-member 30a and hold it in its seat and the link in any desired position of angular adjustment.

By means of these swinging link supports as applied to its opposite ends the deflector plate 20 may be adjusted forwardly and rearwardly relative to the end of the car and gutter 12 and the spacing of the plate from the car top and its angularity relative thereto established and secured.

It is shown in FIG. 9 that the bases 32 for the swinging links are applied to the underside of the horizontal bottom of the gutter. They may be located near or at opposite ends of the rear window frame.

It is further an object of this invention to apply overflow stops to the shallow types of gutters to prevent overflow of water from the gutter impairing vision through the rear window due to such overflow falling on the pane 13 or being driven against it by reason of the wind deflector.

Such an overflow stop has been illustrated in FIG. 5 which shows an elongated strip or plate 50 to be formed along one edge about a rod 51, which is fixed at its opposite ends to mounting brackets 52—52 which are adapted to be attached to the vehicle top adjacent opposite ends of the rear end gutter, as illustrated in FIGS. 8 and 9. The brackets are fixed on the rod in such position that it will hold the plate 50 vertically and firmly against the bottom and back edge wall of the gutter, as a dam whereby overflow onto the window will be prevented. In this arrangement, the plate serves as an upward extension of the back wall of the gutter.

FIG. 5 shows the plate as being equipped on its back side with bases 32, as previously described, and links 30 for the adjustable mounting of a wind deflector 20 of the kind shown in FIGS. 3, 8 and 9.

FIG. 10 illustrates plate mounting links that are adjustable in length. In this form each link comprises a tubular inner end portion forming a cross-member 60 and opposite side legs 61—61 in which the opposite side legs 62—62 of an outer end member 63 are telescopically adjustable and adapted to be held at different positions by the tightening of set screws 64 applied as shown.

What I claim as new is:

In combination, an automobile with a rear window, a rain gutter on said automobile and a wind deflector mounted on said rain gutter; said rain gutter including a horizontal flange portion and an integral upwardly and forwardly extending wall portion, said flange extending across said automobile above the rear window and secured in fixed relationship with the top of the automobile, said wall portion being substantially spaced from the top of the automobile and extending upwardly and forwardly from the free longitudinal edge of said flange and the width of said wall being at least twice the width of said flange whereby said wall completely overlies said flange and extends beyond the flange to overlie an adjacent portion of the top of the automobile, a plurality of mounting brackets secured to the upper surface of said wall, said wind deflector being mounted on said brackets in spaced relationship from said wall, said wind deflector overlying the automobile top and said wall and the forward edge of wind deflector being forward of the wall and the rearward edge being rearward of said rear window.

References Cited in the file of this patent
UNITED STATES PATENTS

| | | |
|---|---|---|
| 2,039,208 | Billman | Apr. 28, 1936 |
| 2,677,572 | Pichard | May 4, 1954 |
| 2,754,148 | Tromblay | July 10, 1956 |
| 2,817,558 | Kubacka et al. | Dec. 24, 1957 |
| 2,919,952 | Riddle et al. | Jan. 5, 1960 |
| 2,933,344 | Shumaker | Apr. 19, 1960 |
| 2,983,547 | Moore | May 9, 1961 |
| 3,015,518 | Nelson | Jan. 2, 1962 |